Oct. 22, 1963     L. E. MASHETER ETAL     3,107,715
PNEUMATIC TIRES
Filed Nov. 16, 1959
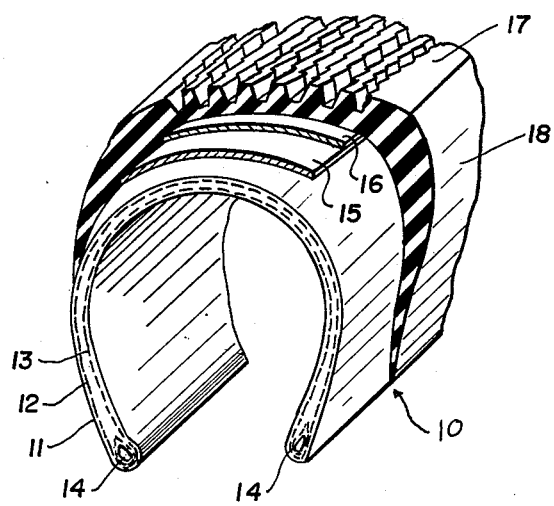
INVENTORS
LAWRENCE E. MASHETER
FRANK B. JONES and
WILLIAM S. UDALL
BY
*Benj. T. Rauber*
their ATTORNEY 3,107,715
PNEUMATIC TIRES
Lawrence Edward Masheter, Frank Bernard Jones, and William Stanley Udall, Sutton Coldfield, England, assignors to Dunlop Rubber Company Limited, a company of Great Britain
Filed Nov. 16, 1959, Ser. No. 852,942
Claims priority, application Great Britain Nov. 22, 1958
1 Claim. (Cl. 152—330)

This invention relates to pneumatic tires.

It has been established that the cornering characteristics of a pneumatic tire can be considerably improved and the tread life can be considerably increased, when compared with that obtained from conventional tire constructions having a lightly reinforced tread, e.g. in a car tire, a tread reinforced with two layers of rayon cords, by utilizing in the said tire a rigid tread reinforcement made from cords, e.g., of substantially inextensible material, such as steel wire cords, or a large number, say six, of layers of rayon cord disposed at a low bias angle, i.e. less than 25° to the mid-circumferential plane of the tire. A tread reinforcement of this construction is unyielding with respect to forces acting on the tread in planes parallel with the road-contact surface.

Such a construction, however, has the disadvantages that the rigid reinforcement produces, on certain road surfaces, both a noisy and an uncomfortable ride, when compared with that obtained from the previously mentioned conventional constructions, and this is brought about by the shocks and vibrations set up by the above described reinforcement of the tire during its passage over the road surface and transmitted through the tire, the wheel, the springs, steering linkages etc., to the car body.

A tire construction, which is made in accordance with the invention, is illustrated in the drawing wherein:

The single FIGURE is a perspective view of a tire casing shown in schematic fragmentary section with portions thereof broken away to illustrate the tire portions in cross section.

It has been discovered that the disadvantages set out above can be lessened by the use, in the tread of the tire, of a rubber having a high "hysteresis loss." The term "hysteresis loss" is used in this specification to mean that energy loss per cubic centimeter of rubber which occurs when a solid block of rubber is deformed by a compressive force in one direction to 9 tenths of its original dimension in the said direction, the block being free from restraint in directions transverse to the said direction, and subsequently allowed to regain its former shape, the cycle of deformation and subsequent regaining of the former shape of the rubber block being carried out in a time of approximately $\frac{1}{50}$ of a second. The value of "hysteresis loss" for a given rubber may vary according to the temperature at which it is measured.

The term "rubber," as used in this specification, includes natural and synthetic rubbers having a Young's modulus of less than $10^9$ dynes per square centimeter at 20° centigrade.

The term "copolymer," as used in this specification is to be understood as denoting polymers derived from two or more monomers, i.e. as including the so-called terpolymers and more complex polymers.

According to the invention, a pneumatic tire 10 comprises a carcass 11, two plies 12, 13 of rayon or the like passed around lead wires 14 in the usual manner, a rigid tread reinforcement comprising two layers 15 and 16 of steel cords or the like disposed at conjugate angles of about 16° to the mid-circumferential plane of the tire. The tread 17 is made from rubber having, in its vulcanized form, a hysteresis loss greater than 0.04 joule per cubic centimeter of rubber at a temperature of 25° centigrade and the side walls 18 may be of the same composition.

Preferably, the pneumatic tire according to the invention comprises a tread made from rubber having, in its vulcanized form, a hysteresis loss greater than 0.04 joule per cubic centimeter of rubber at a temperature of 25° centigrade, and a hysteresis loss of less than 0.03 joule per cubic centimeter of rubber at a temperature of 70° centigrade.

The tread may be made from butyl rubber, that is a copolymer of an iso-olefine with a minor proportion of a diolefine.

Alternatively, the tread may be made from a copolymer of a conjugated diene with a mono-ene, the said copolymer in its vulcanized form having a second order transition temperature above −35° centigrade.

The diene component of the copolymer is conveniently butadiene, but other conjugated dienes, for example isoprene, can be used.

The mono-ene component may usefully be styrene, but may also for example be a lower alkylacrylate, e.g. methyl, ethyl, isopropyl or t-butyl acrylate, a cyano or haloalkyl acrylate or methacrylate, e.g. 2-chloromethyl acrylate, methyl α-chloroacrylate, 2-cyanoethyl acrylate, acrylonitrile or methyacrylonitrile, a lower N-alkyl or N,N,-dialkyl acrylamide or methacrylamide, vinyl pyridine, an alkyl isopropenyl ketone or alkyl vinyl ketone. More than one diene and/or mono-ene can be used if desired.

The relative proportions of the diene and the mono-ene are chosen so as to give a product having a second order transition temperature within the range specified. More particularly, copolymers of butadiene and styrene having a styrene content above 30%, usually between 35 and 60% and especially between 35 and 50%, by weight, are very satisfactory. The copolymers may be obtained by the conventional methods as used for example for making GR–S synthetic rubber.

Preferably also, in the case of a tire tread made from any of the rubbers described above, the rubber covering on the shoulders and sidewalls of the tire is of the same material as that of the tread portion and the plies of the tire carcass each incorporate parallel cords of, e.g., textile material, disposed at 90° to the mid-circumferential plane as shown in the drawing.

When either butyl rubber or a co-polymer of a conjugated diene with a mono-ene as defined above is used in the tread of a tire they have the effect of damping out the vibrations which are set up at the road surface in the manner described above. The "hysteresis loss" of butyl rubber and the rubber defined above at the velocities of deformation and within the operating temperature range normally encountered on the road is considerably higher than that of natural rubber which is normally used in the manufacture of pneumatic tires (a typical value for the hysteresis loss of natural rubber at 25° centigrade is 0.015 joule per cubic centimeter). The energy of the vibration is rapidly absorbed by the hysteresis loss of the said rubber and the vibration is therefore damped out. The effect is increased if, in addition to the rubber of the tread, some or all of the remaining rubber of the tire is also butyl rubber or a copolymer of a conjugated diene with a mono-ene as defined above.

Both butyl rubber and a copolymer of a conjugated diene with a mono-ene as defined above have a further advantage when used in a tire tread, owing to the fact that their hysteresis loss decreases with increase of temperature for temperatures above their transition temperatures, that they have a high hysteresis loss at the tread surface which, during normal operation of the tire is at a relatively low temperature and a lower hysteresis loss in the interior of the tread which reaches a relatively higher temperature during normal operation of the tire. A tire having a tread made from one of the said rubbers thus has the advantages obtained by the provision of a rubber of high hysteresis loss at the tread surface of the tire, together with the advantage of having a rubber in the interior of the tread which has a lower hysteresis loss and which thus helps to prevent high temperatures from being built up in the tire tread during operation of the tire.

In one construction, given by way of example, a pneumatic tire comprises the carcass 11 constructed of two plies of rayon cords the cords being disposed at 90° to the mid-circumferential plane. Tread reinforcement 15, 16 located upon the crown of the carcass comprises two layers of steel cords disposed at about 16° to the mid-circumferential plane, the cords in one layer being disposed in an opposite sense to those in the other layer. A butyl rubber tread 17, the composition of which is given in Example 1, is superposed upon the tread reinforcement and the rubber parts of the tire are of butyl rubber as defined in Example 2.

*Example I*

A suitable butyl rubber tread compound has the following composition:

| | Parts by weight |
|---|---|
| Copolymer of isobutylene/isoprene commercially available under the name butyl 218 | 100.0 |
| I.S.A.F. (intermediate super abrasion furnace) black | 45.0 |
| N₄-N-methyl dinitrosoaniline | 1.5 |
| Calcium stearate | 1.0 |
| Zinc oxide | 5.0 |
| Mineral oil (specific gravity 0.9, Redwood viscosity 1290 secs. at 70° F.) | 5.0 |
| Sulphur | 1.5 |
| Tellurium diethyl dithiocarbamate | 1.0 |
| Benzthiazyl disulphide | 1.0 |
| | 161.0 |

The hysteresis loss of the butyl rubber compound defined in Example I is 0.066 joule per cubic centimeter at 25° centigrade and 0.023 joule per cubic centimeter at 70° centigrade.

*Example II*

A suitable butyl carcass compound has the following composition:

| | Parts by weight |
|---|---|
| Copolymer of isobutylene/isoprene commercially available under the name butyl 325 | 100.0 |
| I.S.A.F. (intermediate super abrasion furnace) black | 40.0 |
| N₄-N-methyl dinitrosoaniline | 0.8 |
| Zinc oxide | 5.0 |
| Hightly refined white petroleum oil available commercially as Bayol F | 10.0 |
| Amberol ST 137x (resin) | 5.0 |
| Phenyl-beta-naphthylamine | 1.0 |
| Tellurium diethyl dithiocarbamate | 1.3 |
| Sulphur | 1.5 |
| Benzthiazyl disulphide | 1.0 |
| | 165.6 |

In an alternative tire construction, given by way of further example, a tire carcass and tread reinforcement constructed similarly to that of the tire described in the previous example is provided with a tread made from a rubber consisting of a copolymer of butadiene and styrene having a styrene content of 40% by weight and compounded as follows:

*Example III*

| | Parts by weight |
|---|---|
| Copolymer | 100 |
| Extender oil | 37.5 |
| Sulphur | 2.2 |
| Cyclohexylbenzylthiazylsulphenamide | 1.2 |
| Stearic acid | 1.0 |
| Zinc oxide | 4.5 |
| Mineral oil | 5.0 |
| "Nonox" HFN (antioxidant—a blend of arylamides) | 1.0 |
| "Santoflex" AW (antioxidant) | 1.0 |
| Furnace black ("Philblack" O) | 70.0 |

The hysteresis loss of the rubber compound defined in Example III is 0.061 joule per cubic centimeter at 25° centigrade and 0.021 joule per cubic centimeter at 70° centigrade.

The tires described above have the following advantages.

Under given conditions, the tires according to the invention provide a quieter and more comfortable ride than is normally associated with a tire having a rigid tread reinforcement; the tires have increased tread life and improved cornering characteristics compared with that obtained from tires having conventional non-rigid tread reinforcements; for a given tread pattern the tires have a reduced tendency to squeal on corners or when subjected to braking conditions when compared with the above-mentioned conventional constructions. The road grip may also be improved.

Although in the examples described above a tread reinforcement consisting of two plies of steel cords is used, it is advantageous in some instances to provide a tire having a lightly reinforced carcass (e.g. a two-ply steel reinforced carcass) with a single-ply steel cord breaker and a tread composed of rubber of high hysteresis loss as defined above.

Having now described our invention—what we claim is:

A pneumatic tire comprising a carcass, a tread reinforcement substantially unyielding with respect to forces acting on the tread in planes parallel with the road contacting surface and a tread rubber having, in its vulcanized form, a hysteresis loss greater than 0.04 joule per cubic centimeter of rubber at a temperature of 25° centigrade and a hysteresis loss of less than 0.03 joule per cubic centimeter of rubber at a temperature of 70° centigrade.

References Cited in the file of this patent

UNITED STATES PATENTS

| 2,811,502 | Gessler et al. | Oct. 29, 1957 |
| 2,813,566 | Ruggeri et al. | Nov. 19, 1957 |
| 2,939,502 | Hindin et al. | June 7, 1960 |

FOREIGN PATENTS

| 726,810 | Great Britain | Mar. 23, 1955 |